Figure 1:
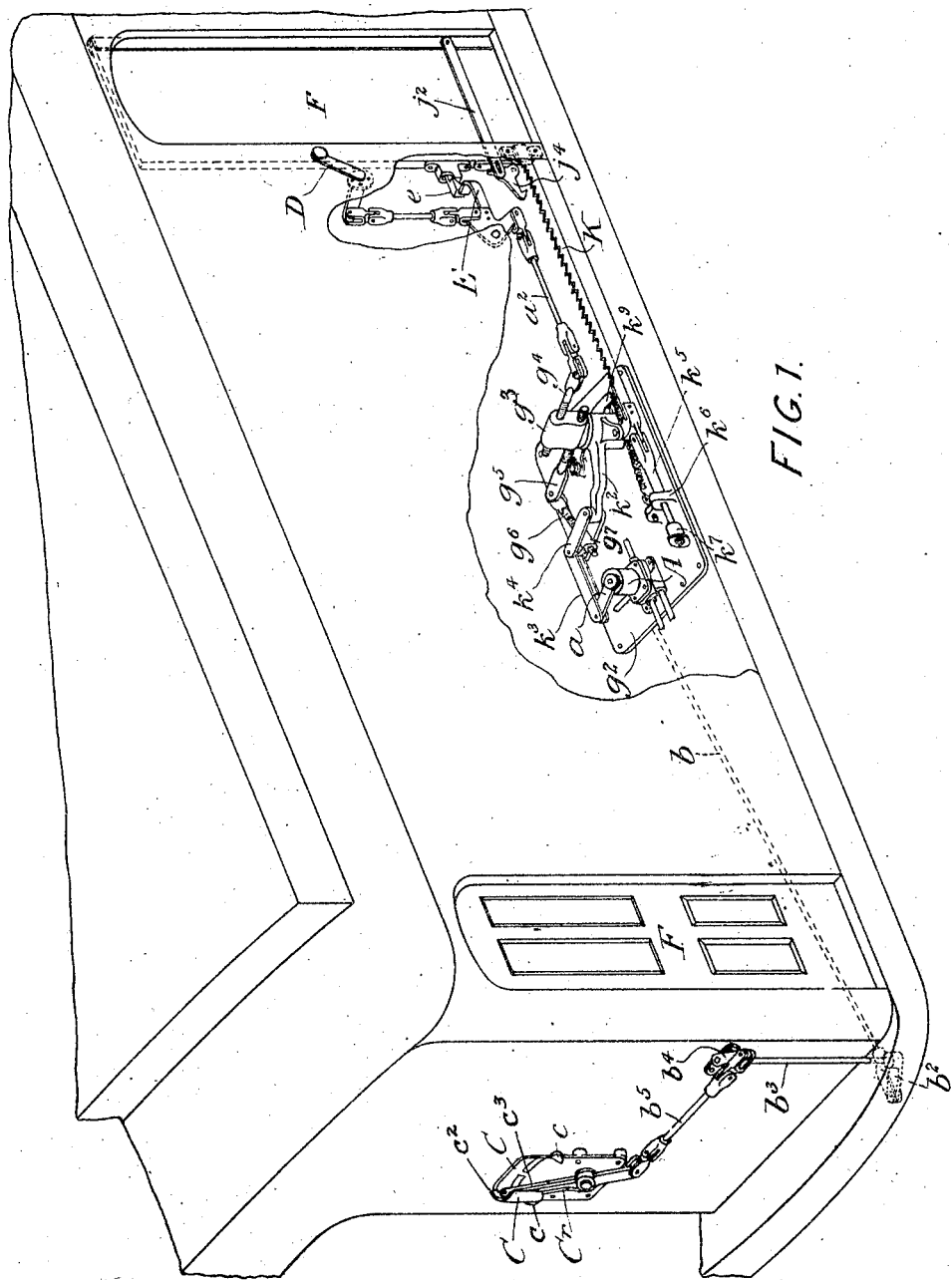

J. F. McELROY.
CONTROLLER FOR CAR DOOR MOTORS.
APPLICATION FILED SEPT. 20, 1909.

987,006.

Patented Mar. 14, 1911.
5 SHEETS—SHEET 1.

Witnesses
L. T. Shaw
J. L. Traiteler

Inventor
James F. McElroy
by E. M. Bentley
Attys.

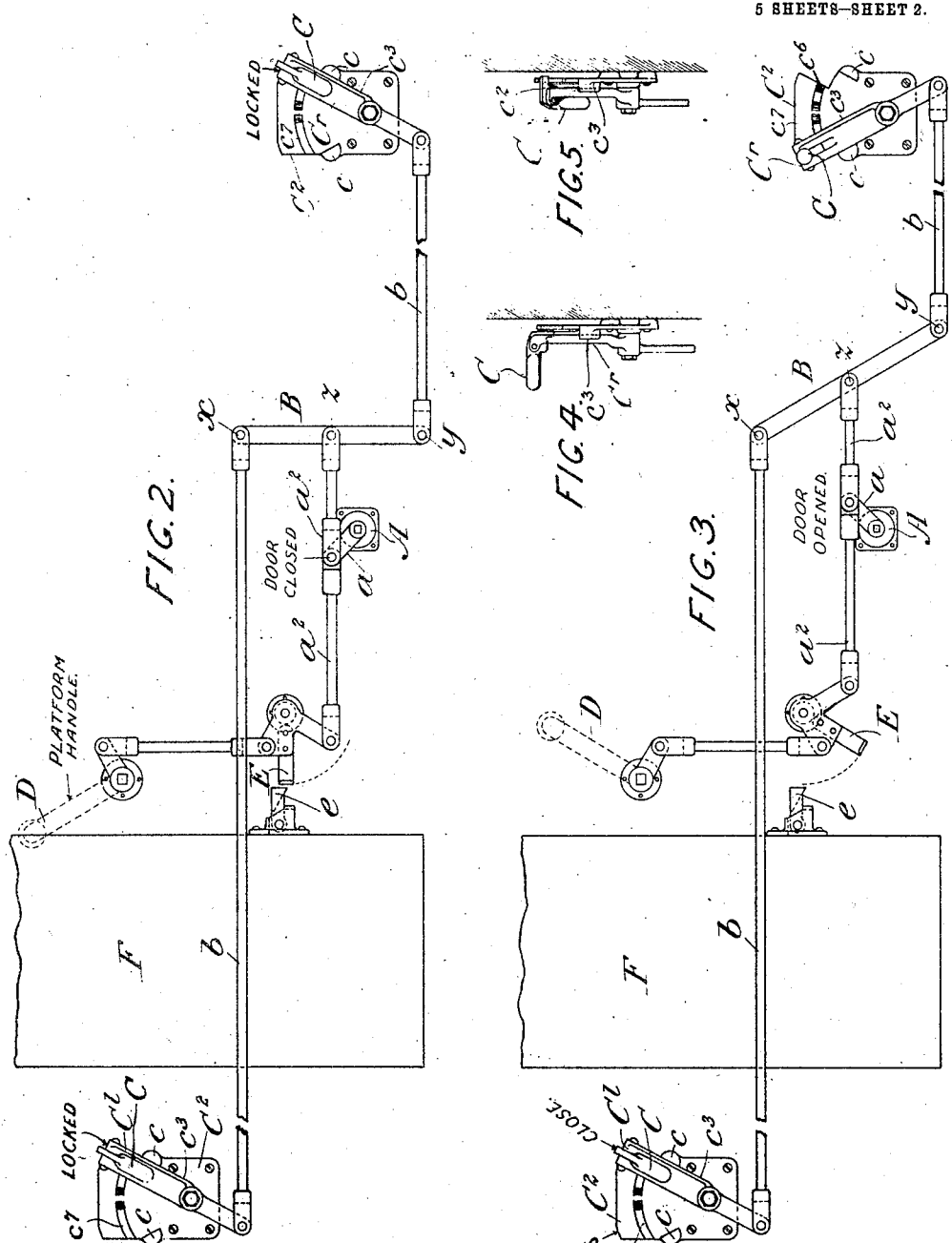

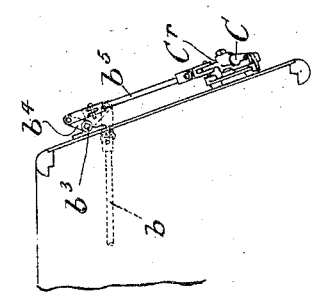
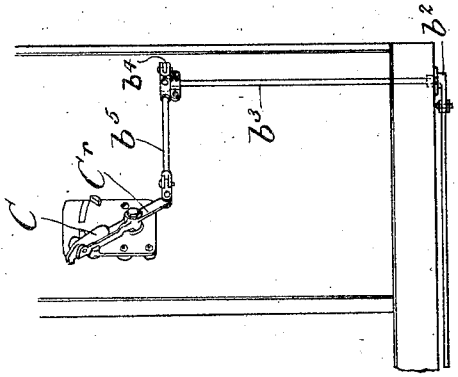
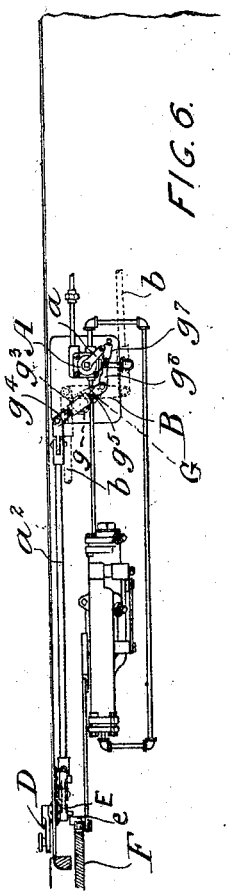
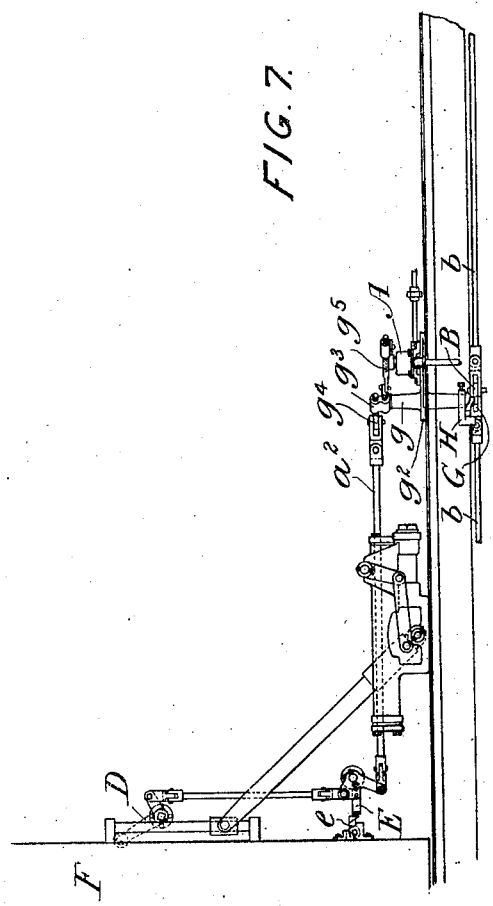

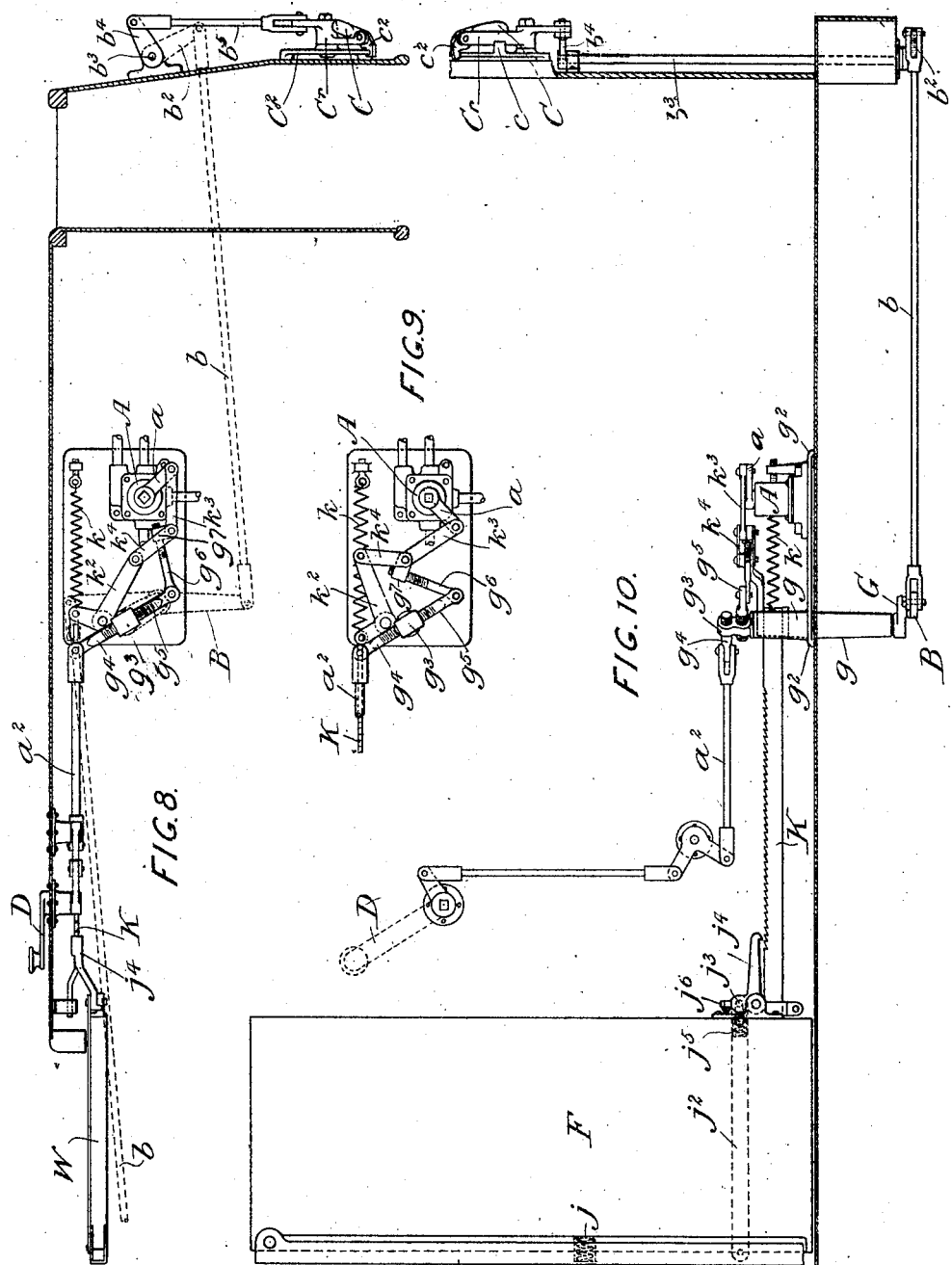

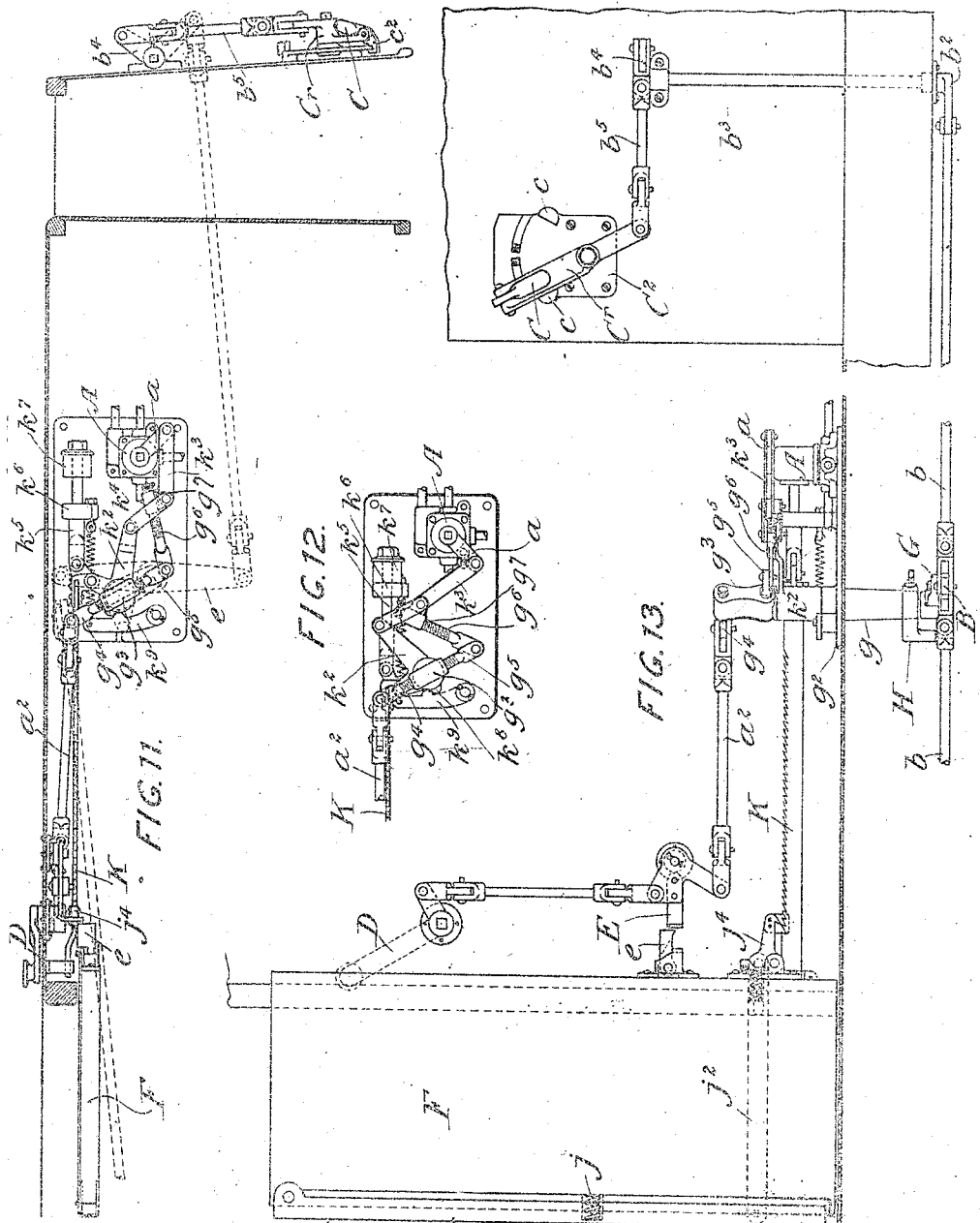

UNITED STATES PATENT OFFICE.

JAMES F. McELROY, OF ALBANY, NEW YORK, ASSIGNOR TO CONSOLIDATED CAR HEATING COMPANY, A CORPORATION OF WEST VIRGINIA.

CONTROLLER FOR CAR-DOOR MOTORS.

987,006.

Specification of Letters Patent. Patented Mar. 14, 1911.

Application filed September 20, 1909. Serial No. 518,648.

*To all whom it may concern:*

Be it known that I, JAMES F. McELROY, a citizen of the United States, residing at Albany, Albany county, State of New York, have invented certain new and useful Improvements in Controllers for Car-Door Motors, the following being a full, clear, and exact disclosure of the one form of my invention which I at present deem preferable.

For a detailed description of the present form of my invention, reference may be had to the following specification and to the accompanying drawings forming a part thereof, in which—

Figure 1 shows my apparatus in position on the car; Figs. 2 and 3 are a diagrammatic representation of the lever scheme; Figs. 4 and 5 are details of the operating handles at the end of the car; Figs. 6 and 7 are plan and side views of the valve connections; Figs. 8, 9 and 10 show the control of the valves by an obstruction strip; Figs. 11, 12 and 13 show a modified form of the obstruction-strip control.

My invention principally relates to the means by which the control of the car doors at either end, and if desired, from the train platform can be accomplished in a manner appropriate to the practical operation of trains such as are employed in urban traffic.

I also provide means for supplementary control by the automatic action of an obstruction-strip on the forward edge of the door.

I illustrate my invention by showing its application to the control valve of a pneumatic type of a motor door.

It will be understood that in the following figures there is shown, in Fig. 1, the application of my invention to the operation of a door of a car such as is ordinarily employed in urban railways, as for instance, the subways of New York city. Fig. 1 also shows that form of my invention in which the arrest of the door by striking an obstruction will serve to automatically work the valve. In Figs. 2 to 4 inclusive, the illustration is somewhat diagrammatic for the purpose of simplifying the principles involved, it being understood that, in practice, the control handles at the ends of the car will not be connected directly to the operating rods $b$, $b$, as shown in Figs. 2 to 5, but will be connected thereto by a system of intermediate levers which will allow the control handles to be placed on the end walls of the car, as shown in Fig. 1, while the rods $b$, $b$, will be underneath the car. Similarly the platform handle D will have its operating connection with the valve and intermediate devices substantially as shown in Fig. 1. Moreover, in practice, the valve arm $a$ of Figs. 2 and 3 will be connected indirectly to the operating rods $b$, $b$, in the manner shown, for example, in Figs. 6 and 7. The principle of operation can, however, best be explained by reference to the somewhat diagrammatic illustration in Figs. 2 to 5, inclusive, which show the invention in its simplest form. It will also be understood that the valve A may be of any desired type capable of admitting air pressure to the door-operating motor and if such motor is of the reciprocating type, as indicated in Figs. 6 and 7, the valve will control the exhaust of the air in the rear of the piston and admission of air in front of the piston for each direction of movement. Such motors and control valves are well known and it is unnecessary to illustrate the details thereof in the present case.

I will first refer to Figs. 2 and 3, wherein A represents the control valve for the pneumatic motors employed to operate the doors, it being understood that when the valve arm $a$ is in the position shown in Fig. 2 each motor will operate to close its door, and will operate to open the door when the valve arm $a$ is in the position shown in Fig. 3. The outer end of valve arm $a$ is connected at $z$ with a movable operating member, to wit, a floating lever B, by a link rod $a^2$, or the lever B may be pivoted directly upon the extremity of the valve arm. From opposite ends of the floating lever B extend the rods $b$, $b$, one leading to the right hand and the other to the left hand end of the car and there connected respectively to the end-operating levers $C^l$ (left) and $C^r$ (right). Each of these end-operating levers is mounted on a plate $C^2$ and oscillate thereon between stops $c$. On the upper end of each lever is pivoted a handle C movable with respect to the lever on a horizontal axis, so as to assume a horizontal position, as shown in Fig. 4 in which the handle stands out at right angles with the lever, or to assume a vertical position as shown in Fig. 5 in which the handle is folded down against the lever. The handle C itself forms an angle or bell-crank lever with a short branch $C^2$ (see Figs. 5, 10 and 7), which when the handle is in the vertical position, falls into a notch or cut away portion $c^6$, shown at the right hand end of Fig. 3, and the lever is thereby locked. It can only be released by lifting the handle to the horizontal position shown in Fig. 4. Thus each handle is locked in the closed position of the door and, on the contrary, in the open position of the door it is not locked but free to swing. Moreover, on the face of each back plate is a curved ridge $c^7$ with a central notch therein whereby as the operator, with handle C lifted, moves the lever over the plate, the short arm $c^2$ of the angle lever handle will fall momentarily into the notch. This will not prevent continued movement of the handle but will indicate to the trainman that the lever, at the moment it passes the notch, is in a position which brings the motor valve to the overlap point at which the valve connects the two sides of the piston so that the air pressure may become equalized on both sides thereof, and will show him that the motor is in the neutral position and that by leaving the handle at that point the door will be free to be opened by hand, while the continued movement of the handle past the notch will cause the motor to open the door. By this means the lever will become locked when in the door-closing position and cannot be moved to the door-opening position except by lifting the handle C from its vertical to its horizontal position. The object of this is to prevent people from reaching in between the cars and grabbing the handle to throw the door open while the train is in motion. I preferably form the operating levers $C^1$ and $C^r$ with a raised edge or flange $c^3$ serving as a guard for the handle which drops in behind the guard, but allowing the fingers to reach over the guard and grasp the handle. It will be understood that, as shown in Fig. 1, the lever will be mounted on the outside end of the car, so that the trainman standing between two cars will face the inside edge of the plate and, after lifting the handle to the horizontal position, will operate the lever by drawing it toward him to open and pushing it from him to close, as has been the common mode heretofore on elevated and subway trains in which the doors have been operated manually by the trainmen.

In Fig. 2 both end handles are shown in the closed and locked position, and if the right-hand lever $C^r$ be then thrown to the open position, as shown in Fig. 2, the floating lever B will fulcrum at the point $x$ on the end of the rod $b$ leading to the left-hand of the car, the left-hand operating lever $C^1$ being locked. Similarly if the parts were in the condition shown in Fig. 2, it is manifest that if the left-hand lever $C^1$ were turned to the open position the floating lever B would fulcrum at the point $y$ at the end of the rod $b$ leading to the right hand end of the car, and the valve would be thereby moved to the open position as appears in Fig. 3, the floating lever having fulcrumed at the point $y$ however instead of at the point $x$. Thus either of the rods $b$ may serve as a fulcrum for lever B. Furthermore, if the parts have been brought into condition shown in Fig. 3 by the movement of the right-hand lever $C^r$ and it is desired to close the door by means of the left hand lever $C^1$, that lever is first moved to the open position, which will merely cause the floating lever to fulcrum at the central point $z$ and thereby swing the right-hand lever $C^r$ to its closed and locked position. Thus the floating lever has a third fulcrum on the end of rod $a^2$ or the valve arm $a$, if the lever B is mounted directly thereon. Then, the right-hand lever $C^r$ being locked, the left-hand lever $C^1$, which is being used will be drawn back to its closed position and the parts will be brought to the door-closing position shown in Fig. 2, the lever B fulcruming at the point $y$. Thus, if a trainman finds the doors open and the lever at which he happens to be stationed is in the closed position he simply first throws it to the open position and then draws it back, while if he finds it already in the open position he draws it back to the closed position without such preliminary movement. In other words, he knows that, to close the door, the lever must be in the open position and if it is not already in that position he moves it there before starting to close the door. By this means the trainman can from either end of the car both close and open the door or doors of the car and at the same time the doors will be locked in their closed position and if they have previously been operated from the other end he does not have to go to that end to release them.

I have thus far referred only to the operating levers at the car ends, but I may also have an intermediate operating lever and handle on the outside of the car by which one of the platform-men can close the doors from the outside, it being however impossible for him, or an excited passenger to catch hold of the platform and open the doors after they have once been closed. Such a platform handle is shown in dotted lines at D, Figs. 2 and 3, also in full lines in Fig. 1. This platform lever D operates the aforesaid valve arm $a$ by means of the said rod $a^2$ and the cranks and connecting rod shown as intervening between it and lever D. Of course, if the doors were closed, they would be locked by the end handles and the valve could not be worked by the platform handle. If, however, the end handles are in the open and unlocked position, then the turning of the platform handle will throw the valve into the closing position and at the same time will throw into such closing position that one of the end handles which had been previously used to open the door and automatically lock it. I may also add to the apparatus thus far described a mechanical locking device consisting of a steel bar E mounted on the lower crank of the platform handle and having an offset at its extremities. When the parts are in the closing position shown in Fig. 2 the said offset will stand in the path of a dog $e$ on the door and lock the door. The dog $e$ is pivoted to the door and has an inclined surface on its under side, shown by dotted lines in Figs. 2 and 3 and in full lines in Fig. 1, so that if the door has been opened and one of the controlling levers is then turned to close it, the dog will slide over the aforesaid offset on the bar dog $e$ without obstructing the progress of the door to its closed position, and then drop in front of the offset to lock the door. The cranks, the platform handle and the mechanical lock just mentioned will be placed in the space behind the door so that the door in opening will pass by them and leave them inclosed in the space behind the door inside of the car. The purpose of this mechanical lock is to give additional security in the event of the air pressure being taken off the car, as sometimes happens. In such an event the door, when closed, is still held closed by this mechanical lock and the lock can be released by the operation of the handle at either end of the car and the door can then be opened by hand. The movement of either of the end handles or the platform handle will throw the mechanical lock E out of the path of the dog $e$ on the door and release it.

While I have shown in Figs. 2 and 3 the direct connection of the valve arm $a$ to the rods $b$, $b$, through the floating lever B, the connection will in practice be preferably a more indirect one, as shown in the remaining figures of the drawings, in order to bring the rods $b$, $b$, underneath the car floor and the valve A above the car floor. The principles of operation, however, remain the same. In that case the floating lever B will be pivoted at its center on the extremity of a crank arm which projects radially from the lower end of a vertical shaft passing through the floor of the car, and the upper end of this shaft will have an operating connection with the valve arm $a$. This differs only in the form of the mechanical connection between the floating lever B and the valve arm $a$ from the simplified arrangement shown in Figs. 2 to 4 inclusive, the form of the mechanical connection being a matter of detail, and it being also understood that there is the same characteristic action heretofore described of the rods $b$, $b$, upon the floating lever B and a mechanical connection from said floating lever to the valve arm $a$ for operating it. Referring to Figs. 6 and 7, the floating lever B heretofore described and the rods $b$ $b$ are shown as placed under the floor of the car, as particularly appears in Fig. 7 and as indicated by the dotted lines in Fig. 6 (see also Figs. 11 and 13). The rod $b$ extending to the right-hand end of the car is jointed to a crank $b^2$ on the lower end of a vertical shaft $b^3$, a similar crank arm $b^4$ on the upper end of the shaft $b^3$ being connected by a rod $b^5$ to the aforesaid operating lever $C^r$. The floating lever B to which the rods $b$ $b$ are jointed is centrally pivoted to the end of a crank arm G which is best shown in Figs. 10 and 13, and this crank arm is on the lower end of a vertical rock shaft mounted in a sleeve $g$ cast integrally with a base plate $g^2$ on the upper side of the car floor, this same casting forming also a seat for the valve A. The said vertical shaft terminates at its upper end in a block $g^3$ (see also Figs. 8, 9 and 10) perforated transversely by two screw threaded holes into each of which is screwed a forged bolt with a clevis head in which head may be pivoted one end of the link. The bolts are designated respectively $g^4$ and $g^5$. To the extremity of $g^4$ is pivoted the rod $a^2$ leading to the lower bell crank of the platform lever, while $g^5$ is linked to the valve arm $a$ by means of a link $g^6$ screwed into the sleeve $g^7$ which is pivoted to the extremity of the said valve arm $a$, see Figs. 6 and 7. This arrangement provides for the required adjustment also for lost motion and the locking of the adjustment. The air valve may be thereby so set as to cover the ports only partly either in one direction or in both directions. That is, by disconnecting the link $g^6$ from the bolt $g^5$ and screwing out the bolt $g^5$ an increase in the radial length of the bolt with a consequent increase in the travel of the link may be obtained; then by adjusting the length of the link $g^6$, the position of the arc over which the valve arm $a$ is to travel can also be determined. These two means permit any desired adjustment of the valve, and when the link is again joined to the bolt the adjustment is positively maintained. The vertical rock-shaft mentioned above as mounted in the sleeve $g$ on the casting containing the plate $g^2$ furnishes an oiled bearing with little lost motion and the casting also serves as a support for the vertical shaft and its associate parts independent of any clamps or attachments to the car. I also call attention to the ring H (Figs. 7 and 13) surrounding the lower portion of the sleeve $g$ and provided with a depending finger and a retaining set screw. This acts as a stop to limit the motion of the crank arm $g$ on the rock shaft in the direction of motion when the valve is thrown to open the door. When the trainman at one end of the car throws his handle to open position, then the crank on the vertical rock-shaft strikes this stop. When the trainman at the opposite end wishes to shut the door he first throws his handle to open position as above described and the stop prevents further movement of lever B in that direction. The floating lever B therefore causes the handle at the opposite end of the car to go to the closed position and lock.

I will next describe the means employed for cutting off power from the door when it strikes an obstruction, this being shown in Figs. 8 to 13, attention being particularly called to Figs. 10 and 13. In general it may be said that this device for automatically cutting off the power when the door encounters an obstruction is a supplementary feature which may be employed or not, as desired. When it is employed it is obvious that there must be an additional valve-operating agency provided which will enable the valve to be operated automatically from the door, and that this additional valve-operating agency must not interfere with the normal operation of the valve by the rods $b$, $b$, and the handles at the opposite ends of the car. I accomplish this by interposing between the link $g^6$ and the valve arm $a$ of Fig. 6, a toggle joint operated from the door in such a way that when the door is in its normal condition there will be no interference with the operation of the valve by the rods $b$, $b$, in the way I have heretofore described. The action of the door will, however, break the aforesaid toggle joint and thereby work the valve independently of the said rods $b$, $b$, which will remain in the condition in which they happen to be at the time and which will regain their normal control of the valve by a return of the toggle to its normal condition after the automatic action thereon of the door has ceased. The door F is provided with an obstruction-strip $J^4$ forming the forward or leading edge of the door and pivoted to the door at its upper end, its lower end being normally pressed outward by a spring $j$, while near the bottom it is pivoted to a horizontal bar $j^2$ extending through the door and having at its right-hand end a slot which receives a pin $j^3$ on the shorter end of a bell crank pawl $j^4$, a spring $j^5$ in the slot giving a yielding bearing against the pin. There is also a screw $j^6$ which limits the play of the pawl $j^4$. By this means any obstruction encountered by the door presses the obstruction-strip inward and throws down the pawl $j^4$ into engagement with a rack-bar K which is normally drawn to the right by a spring $k$ but when engaged by the pawl is drawn to the left by the movement of the door. The rack K is connected to the shorter arm of a bell crank lever $k^2$ as appears in Figs. 8 and 9. In this case the aforesaid link $g^6$ which operates the valve arm $a$ does not lead directly to the arm $a$ but to a link $k^3$ (see Figs. 8, 9 and 10) intervening between the aforesaid sleeve $g^7$ and the valve arm $a$. The bell crank lever $k^2$ just mentioned i connected by a link $k^4$ to the said sleeve $g^4$. The result is that as the pawl $k^4$ draws the rack-bar K to the left, it swings the bell-crank $k^2$ and thereby throws the parts from the position shown in Fig. 8 to that shown in Fig. 9, thereby operating the valve arm $a$ independently of the normal valve-operating mechanism under the control of the operating levers at the ends of the car. In other words, there is a sort of toggle joint connection between the valve arm $a$ and the forged bolt $g^5$ which normally remains stiff and allows the movement of $g^5$ caused by the operating of the end levers, to be communicated to the valve arm, but the joint of this toggle is broken, as appears in Fig. 9, in the abnormal event of an obstruction to the door. The above described operation of the valve arm $a$ by the obstruction apparatus will throw the valve to the opening position and the door will immediately reverse and move backward until the trainman throws his handle to open position, which will restore the aforesaid toggle to its normal condition and permit the trainman to restart the door toward closing position in the usual way when the obstruction has been removed.

A modification of this obstruction apparatus is shown in Figs. 11, 12 and 13 and while acting on the same principle is in some respects preferable as a matter of detail. I intend in this patent to make claims covering generically the toggle-breaking device by which the door itself is given an automatic and temporary control of the valve, whether such device assumes the specific form shown in Figs. 8, 9 and 10, or the specific form shown in Figs. 11 and 12, which, in a word, differ only as to the point at which the bell crank $k^2$ is pivoted, or whether it assumes some other equivalent form. Specific claims will, however, be directed to the form shown in Figs. 11 and 12, which, it may be observed, is the specific form which is also shown in Fig. 1. In this case the arrangement of the door with its obstruction-strip, the pawl $j^4$ and the rack-bar K is the same as that heretofore described, but the aforesaid bell crank $k^2$ is mounted directly upon the vertical sleeve $g$ which carries the vertical rock-shaft, the short arm of the bell crank being connected to the rack-bar as before, but there is also pivoted to the same shorter end of the bell-crank $k^2$ a guide bolt $k^5$ sliding in a bearing $k^6$. The right-hand end of the guide bolt $k^5$ carries a rubber buffer $k^7$ which abuts against the bearing $k^6$ and serves as a stop for the rack-bar when that bar is drawn forward by the door and the reversing operation has completed its movement. Furthermore, the bell crank $k^2$ where it is mounted as aforesaid on the vertical sleeve $g$ has a rounded lug $k^8$ engaging a similar lug on a spring-pressed latch-lever $k^9$. When the door encounters obstruction the rack-bar moves the bell crank lever $k^2$ which carries forward the lug $k^8$ against the similar lug on the latch $k^9$ and causes the latch-bar $k^9$ to move back against the force of its spring until the lug snaps under the corresponding lug on the latch and the latch then holds the bell crank $k^2$ in the position to which the door has thrown it. The door therefore being reversed continues to move back toward its open position until the pawl $j^4$ on the door strikes the shorter end of the bell crank lever $k^2$ and forces it away from the control of the latch bar $k^9$, the said lug $k^8$ and the corresponding lug on the latch $k^9$ being somewhat rounded to permit them to be disengaged when sufficient force is applied. Thereupon the door is again reversed and the parts return automatically from the door-opening position shown in Fig. 12 to the door-closing position shown in Fig. 11. Thus the door automatically closes itself without action by the trainman, it being supposed that the obstruction has been removed in the meanwhile. If, however, the obstruction is not removed the automatic reversing action will be repeated until the door finds the obstruction removed and goes on to its closed position. In this way it is not necessary for the trainman to keep watch of the door, knowing that if it encounters some obstruction, such as a belated passenger, it will automatically open and let the passenger in and then reclose itself.

It will be understood that the substance of my invention may be embodied with a variety of different specific forms without departing from the essential spirit of the invention.

What I claim as new and desire to secure by Letters Patent is:

1. The combination with a car door, of a motor, a controller for the motor, operating levers at the respective ends of the car both connected to the said controller, and a lock for the closed position of the said levers, the said levers being left unlocked at the open position.

2. The combination with a car door, of a motor, a controller for the motor, a movable operating member for said controller, operating handles at each end of the car locked in their closed positions but free in their open positions, and oppositely arranged connections between each of the said handles and the said operating member.

3. The combination with a car door, of a motor, a controller for the motor, a movable operating member for said controller, a handle at one end of the car connected to the member, a handle at the opposite end of the car, and a fulcrum for the said operating member connected to the last mentioned handle.

4. The combination with a car door, of a motor, a controller for the motor, operating handles at each end of the car, and a connection between the handles for moving the handle at one end by means of the handle at the other end.

5. The combination with a car door, of a motor, a controller for the motor, an operating member for said controller, an operating handle at each end of the car, each handle being locked in its closed position but free in its open position, and a connection between the two handles for moving the handle at one end from its free to its locked position by the handle at the other end.

6. The combination with a car door, of a motor, a controller for the motor, an operating member for the controller, and two fulcrums for said member controlled from opposite ends of the car respectively.

7. The combination with a car door, of a motor, a controller for the motor, a movable operating member for the controller, a connection between the controller and an intermediate point on said member, and fulcrums for said member at its ends, the said fulcrums being controllable from each end of the car respectively.

8. The combination with a car door, of a motor, a controller for the motor, an operating lever for said controller, and a fulcrum at each end of said lever controlled by a handle at one end of the car.

9. The combination with a car door, of a motor, a controller for the motor, an operating lever for the controller, a handle at each end of the car, and three fulcrums for the said operating lever, two of the said fulcrums being connected respectively to the said handles and serving for the operation of the controller from either end of the car and the third fulcrum being connected to the controller, and serving for the operation of the handle at one end by the handle at the other end.

10. The combination with a car door, of a motor, a controller for the motor, a floating lever, a connection from said lever to the controller, a push and pull rod extending from the opposite ends of said lever to the respective ends of the car, an operating handle for each of the said rods, and a lock for the closed position of each handle.

11. The combination with a car door, of a motor, a controller for the motor, an operating lever for the controller, a handle for the lever movable to either a horizontal or vertical position, and a lock for the lever controlled by the said handles.

12. The combination with a car door, of a motor, a controller for the motor, operating handles for the controller at each end of the car, a platform handle, and a lock for the platform handle controlled by an end handle.

13. The combination with a car door, of a motor, a controller for the motor, a platform handle connected directly to said controller, and end handles connected thereto through an intermediate movable member.

14. The combination with a car door, of a motor, a controller for the motor, an operating handle for the controller, a lock for said handle, and a lock for the door operated by said handle.

15. The combination with a car door, of a motor, a controller for the motor, an operating lever for the controller, a handle for the lever movable with respect thereto, and means for temporarily engaging the handle to indicate the lap position of the motor.

16. The combination with a car door, of a motor, a controller for the motor, a base for said controller, a shaft-bearing on the said base, a shaft therein, an operating connection between said shaft and controller, an operating handle at each end of the car, and a connection between each of the said handles and the said shaft.

17. The combination with a door, an operating motor therefor, a controller for the motor, an oscillating shaft for operating the controller, and an adjustable connection between the said shaft and controller for varying the controller movements with respect to the shaft.

18. The combination with a door, of an operating motor therefor, a controller for the motor, an operating shaft for operating the controller, a crank on said shaft, and an adjustable link connecting the said crank with the controller.

19. The combination with a door, of an operating motor therefor, a controller for the motor, an operating shaft for operating the controller, a crank on said shaft, and a link adjustable in length connecting the said crank with the controller.

20. The combination with a door, of an operating motor therefor, a controller for the motor, an operating shaft for the controller, and a crank on the said shaft adjustable radially for varying the throw of the controller.

21. The combination with a car door, of a motor for operating the same, a controller for said motor, a plurality of operating handles for said controller and located one at each end of the car, and a device for operating said controller independently of said handles.

22. The combination with a car door, of a motor for operating the same, a controller for said motor, a plurality of operating handles for said controller and located one at each end of the car, connections between said handles and said controller holding the parts in predetermined relation, and a device for operating said controller independently of said handles.

23. The combination with a car door, of an operating motor therefor, a controller for the motor, an operating shaft for the controller, handles at each end of the car connected with the said shaft, a connection between the shaft and the controller, and a third operating device acting on the said connection between the shaft and controller.

24. The combination with a car door, of an operating motor therefor, a controller for the motor, operating handles for the controller at each end of the car, a shaft, toggle connection between said shaft and controller, and a third operating device for the controller connected to the said toggle.

25. The combination with a car door, of an operating motor therefor, a reversing controller for the motor, an operating handle for the controller at the end of the car, an obstruction-strip for the door, and a controller-reversing connection between said strip and the controller.

26. The combination with a car door, of an operating motor therefor, a reversing controller for the motor, an obstruction-strip for the door, an operating connection for the controller dominated by said strip, and means for automatically reversing the controller after its reversal by the said strip.

27. The combination with a car door, of a motor therefor, a reversing controller for the motor, an operating connection between said door and controller dominated by an obstruction-strip, and a restoring device for again reversing the motor by the movement of the door.

28. The combination with a car door, of an operating motor therefor, and a reversing controller for the motor operated alternately by the door itself and by the action of an obstruction-strip.

29. The combination with a car door, of an operating motor therefor, a reversing controller, an extension therefrom in the path of the door and an operating connection for said controller dominated by an obstruction-strip, whereby the controller will be alternately reversed by the action of the door and the action of the obstruction-strip.

In witness whereof I have hereunto set my hand before two subscribing witnesses, this 11th day of September, 1909.

JAMES F. McELROY.

Witnessese:
BEULAH CARLE,
JOHN M. ESTERLY.